United States Patent [19]
Liepa

[11] 3,808,962
[45] May 7, 1974

[54] METHOD OF AND APPARATUS FOR MAKING SUBSTANTIALLY UNIFORMLY SHAPED FLAKES

[75] Inventor: Alexander L. Liepa, Cincinnati, Ohio

[73] Assignee: The Proctor & Gamble Company, Cincinnati, Ohio

[22] Filed: Oct. 1, 1971

[21] Appl. No.: 185,607

[52] U.S. Cl................ 99/323.4, 425/246, 425/261, 425/298, 425/313, 425/449
[51] Int. Cl....... A21c 5/08, A21c 9/08, A23p 1/00, B29b 5/06
[58] Field of Search........... 99/323.4; 425/246, 261, 425/298, 313, 449

[56] References Cited
UNITED STATES PATENTS

| | | | |
|---|---|---|---|
| 3,025,564 | 3/1962 | Voigt | 425/313 X |
| 3,550,189 | 12/1970 | Lotz | 425/449 X |
| 3,465,694 | 9/1969 | Benedettelli | 425/313 X |
| 2,842,072 | 7/1958 | Graves | 99/323.4 X |
| 3,190,210 | 6/1965 | McComb | 99/323.4 |

*Primary Examiner*—Wayne A. Morse, Jr.
*Attorney, Agent, or Firm*—Richard C. Witte; John V. Gorman; Thomas J. Slone

[57] ABSTRACT

A method of and apparatus for making substantially uniformly shaped flakes of extrusible material as it issues from an extruder. The material is extruded directly into an unsealed flake-shaping void until a flake-shaped mass thereof accumulates in the void. After a flake-shaped mass has accumulated in the void, the void is physically de-formed and the flake-shaped mass is separated whereupon it becomes a discrete flake. The void is defined as the space between an external area of the extruder contiguous to its discharge port and a first surface of a movable element when the first surface faces the discharge port and is spaced the thickness of the void therefrom. The void is alternately formed and de-formed by moving the element having the first surface relative to the discharge port. The void is periodically de-formed to enable separating accumulated flake-shaped masses from the apparatus as by scraping the nose of the extruder with a knife blade. Mass formation and removal are facilitated by: combining the element having the first surface with a knife blade to form an integrated component; and revolving the component in the proximity of the discharge port so that the first surface and the blade alternately perform their respective functions.

2 Claims, 9 Drawing Figures

PATENTED MAY 7 1974
3,808,962
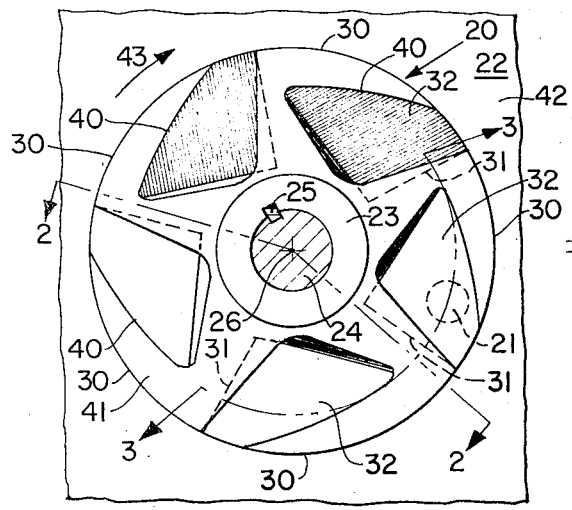
Fig. 1
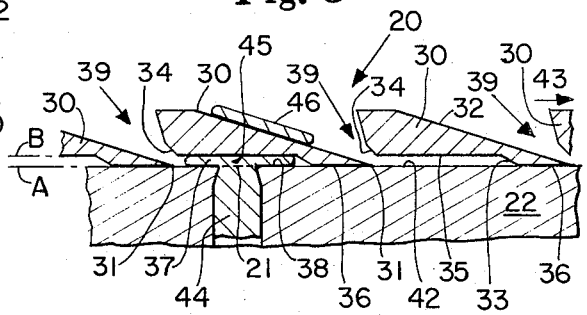
Fig. 3
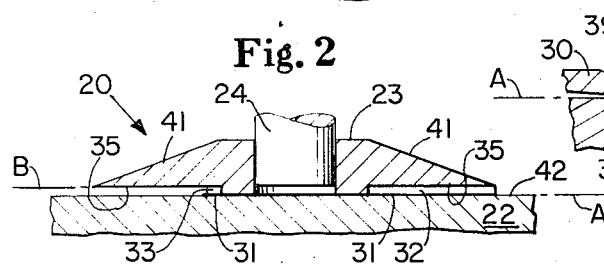
Fig. 2
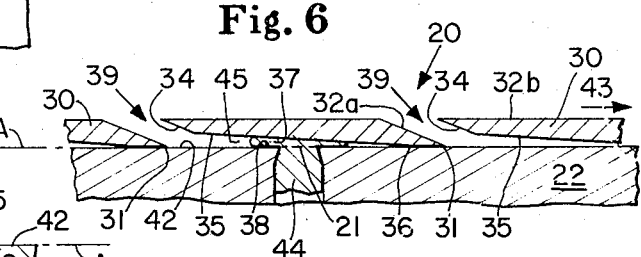
Fig. 6
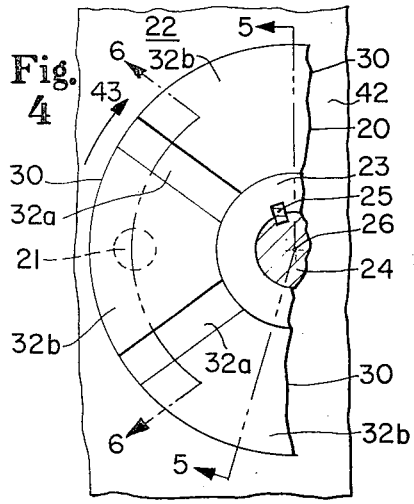
Fig. 4
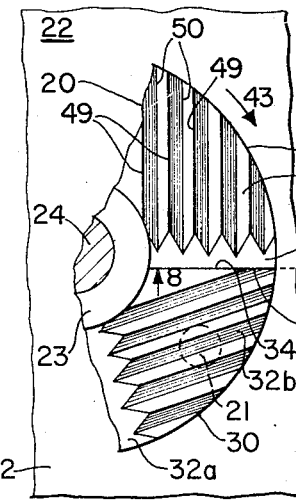
Fig. 7
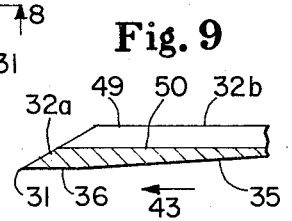
Fig. 8
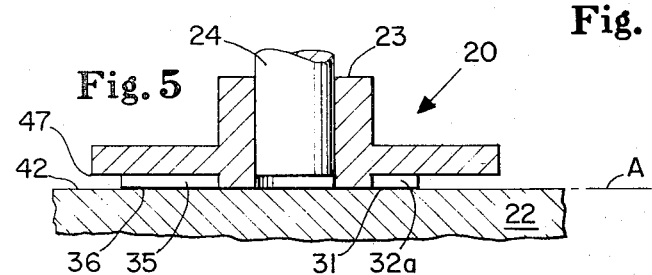
Fig. 5
Fig. 9
INVENTOR.
Alexander L. Liepa
BY Fredrick H. Brown
ATTORNEY 3,808,962

METHOD OF AND APPARATUS FOR MAKING SUBSTANTIALLY UNIFORMLY SHAPED FLAKES

FIELD OF THE INVENTION

This invention relates generally to manufacturing flake type products such as breakfast cereals and relates specifically to forming substantially uniformly shaped flakes of extrusible pressure-release puffable material as it issues from an extruder.

DESCRIPTION OF THE PRIOR ART

Flakes of comestible material are commonly made by preparing a frit of cooked material and forming flakes thereof by passing the material through a two-roll mill. Flakes formed in this manner are not uniformly sized or shaped. The milled frit process of producing flaked breakfast cereals is treated exhaustively in The Manufacture of Cereal Flakes by E. J. Gehrig, American Miller and Processor, Vol. 92, No. 4 pp 21–23, Vol. 92, No. 5 pp. 16–18, and Vol. 92, No. 7 pp. 30–32.

Extrusion puffing of non-flaked comestibles such as snack foods having tubular or cylindrical shapes is disclosed in three U.S. patents issued to George O. Graves. Graves' U.S. Pat. No. 3,291,032, issued Dec. 13, 1966 and his U.S. Pat. No. 2,853,027 issued Sept. 23, 1958 and his U.S. Pat. No. 2,842,072 issued July 8, 1958, show a variety of two stage extrusion heads, each of which is operated in conjunction with a rotating knife assembly to sever extruded material into collets having substantially uniform lengths. In U.S. Pat. No. 2,842,072, Graves discloses, Col. 4 line 50 et seq., the use of a ". . . revolving knife 28 passing intermittently" to sever ". . . the extruded puffed material into sections of desired length. The speed at which the knife revolves in relation to the rate at which material is extruded determines the length of the sections." In U.S. Pat. No. 2,853,027 Graves reiterates, Col. 4 lines 23–25, the use of the speed of the knife to control the length of extruded sections or collets. And, in U.S. Pat. No. 3,291,032, Graves again reiterates, Col. 3, lines 33–35, the use of the speed of the knife to control the lengths of extruded "finger or pellet-like products."

U.S. Pat. No. 3,462,276 issued to John O. Benson, Aug. 19, 1969, discloses forming uniformly sized and configured hollow tubular pieces of snack food and the like as it emerges from an extruder. A revolving knife blade is used to sever the extruded material into discrete lengths after which the discrete lengths are subjected to intense heating to puff them. Puffing per se is not done concurrently with the formation of the discrete lengths.

U.S. Pat. No. 3,467,987 issued to Billy J. Foster, Sept. 23, 1969, discloses an example of a revolving knife for use on an extruder to sever extruded material into discrete particles. The disclosure encompasses means for adjusting the clearance between the die face and the cutting edge of the knife to preclude burning which would occur if the cutting edge of a high speed knife, such as one revolving at 4,000 RPM, directly scraped the die face.

SUMMARY OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the invention is the provision of a method of and apparatus for making substantially uniformly shaped flakes of extrusible material.

Another object of the invention is the provision of a method of and apparatus for making puffed, substantially uniformly shaped flakes of pressure-release puffable, extrusible material.

Yet another object of the invention is the provision of an apparatus for making substantially uniformly shaped flakes of extrusible material issuing from an extruder by alternately forming and de-forming a flake-shaping void contiguous with the discharge port of the extruder in which void extruded material will accumulate to form a flake-shaped mass and, upon de-forming the void, removing the mass from said apparatus whereby the mass becomes a discrete flake.

A further object of the invention is the provision of an apparatus as described next above for making substantially uniformly shaped flakes wherein the flake-shaping void is alternately formed and de-formed and each resulting flake-shaped mass is removed from the apparatus by a rotating, integrated component coacting with the external area of the extruder contiguous with the discharge port of the extruder, the co-action being in timed relation with the rate of material issuing from the extruder.

These and other objects are achieved by issuing extrusible material directly into an unsealed, formable/de-formable, wafer-shaped, flake-forming void until a flake-shaped mass of the material accumulates. Then, the void is de-formed and the mass is separated from the apparatus.

An integrated component having a first surface and a knife blade is provided to be operated in timed relation with the rate of material issuing from an extruder. The component is adapted to co-act with an external area of the extruder contiguous with its discharge port so that: the flake-shaping void is formed when the first surface of the component is adjacent to but spaced from the discharge port; the void is de-formed when the first surface is moved away from the discharge port; and, the knife blade of the component separates the mass from the apparatus by scraping the area of the extruder contiguous to the discharge port as the void is de-formed.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIG. 1 is a fragmentary elevational view of a preferred apparatus embodying the instant invention showing an extruder having a rotatably mounted flake forming and separating component rotatably mounted adjacent the discharge port of the extruder.

FIG. 2 is a fragmentary sectional view of the flake forming and separating component taken along line 2—2 of FIG. 1.

FIG. 3 is a fragmentary sectional view of the flake forming and separating component of FIGS. 1 and 2 taken along the radially outwardly oriented line 3—3 of FIG. 1.

FIG. 4 is a fragmentary elevational view of an alternate apparatus embodying the instant invention showing an alternate configuration of a rotatably mounted flake forming and separating component adjacent the discharge port on the nose of an extruder.

FIG. 5 is a fragmentary sectional view of the alternate configuration of a flake forming and separating component of FIG. 4 taken along line 5—5 thereof.

FIG. 6 is a fragmentary sectional view of the alternate configuration of a flake forming and separating component of FIG. 4 taken along line 6—6 thereof.

FIG. 7 is a fragmentary elevational view of an alternate apparatus embodying the instant invention showing yet another alternate configuration of a rotatably mounted flake forming and separating component having fluted front faces.

FIG. 8 is a fragmentary sectional view of the fluted flake forming and separating component of FIG. 7 taken along line 8—8 thereof.

FIG. 9 is a fragmentary sectional view of the fluted flake forming and separating component of FIGS. 7 and 8 taken along line 9—9 of FIG. 8.

DESCRIPTION OF THE PREFERRED EMBODIMENT

Referring now to FIG. 1, a preferred embodiment of the instant invention is shown to include a flake forming and displacing component 20 adjacent discharge port 21 of extruder 22. Component 20 is shown in FIG. 1 to have a disk shape and in FIG. 2 to have a generally frusto-conical sectional profile. Component 20 having a bored and broached hub portion 23 is secured to a driven shaft 24 and keyed thereto by key 25 for rotation by suitable drive means (not shown) on axis 26.

Component 20 further comprises a plurality of knife blades 30 each having, FIG. 3, parting edge 31, front face 32, backface 33, and trailing edge 34. Extending circularly from backface 33 is first surface 35 which is, in the preferred embodiment, planar. Sliding surface 36, in the preferred embodiment, is planar and lies in an imaginary plane, designated plane A, that is perpendicular with respect to axis 26. Although the included angle between front face 32 and sliding surface 36 is depicted as being approximately seventeen and one half degrees, the angle is selected from a range of oblique angles so that parting edges 31 of component 20 will, as component 20 is rotated on shaft 24, peel rather than bulldoze flake-shaped masses 37 from external area 38 of extruder 22, the formation of such masses 37 and the nature of area 38 being described in greater detail hereinafter.

Parting edges 31, FIGS. 1 and 3, of component 20 extend generally radially in plane A of sliding surfaces 36 so that when component 20 is rotated on shaft 24 edges 31 define an imaginary annular surface, designated surface X, which is not indicated in the figures. As best seen in FIG. 3, each parting edge 31 underlies trailing edge 34 of the adjacent blade 30 and is spaced therefrom forming radially extending flake-passing slots 39 therebetween.

Front face 32, FIG. 1, of each blade 30 spirals circularly from parting edge 31 to where it blends into residual conical surfaces 41 of component 20 along line 40.

Referring again to FIG. 3, first surfaces 35 of the preferred embodiment are co-planar in a plane designated plane B. Plane B is parallel to plane A and spaced therefrom, the distance between planes A and B being the thickness of flake-shaping voids 45 as will hereinafter be described more fully.

Extruder 22, FIGS. 1 and 3, has discharge port 21 disposed in vertical wall 42 of its nose. The external area 38 of wall 42 contiguous with port 21 is configured to co-act with component 20, as component 20 is rotated in the direction indicated by arrow 43, FIG. 1, so that, alternately, a first surface 35 passes over port 21 and then the parting edge 31 of the following blade 30 scrapes area 38 surrounding port 21.

In operation, component 20 is rotated on shaft 24 by means, not shown in the figures, in timed relation with the rate of extruding extrusible material 44 from port 21 of extruder 22.

While a first surface 35 is disposed opposite port 21, wafer-shaped flake-shaping void 45 is formed between and defined by that first surface 35 and the external planar area 38 of extruder 22 contiguous with and surrounding port 21. By defining void 45 as the space between area 38 and first surface 35, void 45 is edgeless. Therefore void 45 is unsealed. While void 45 is formed, extrusible material 44 issuing from port 21 is forced, by the pressure within the extruder 22, to flow somewhat radially outwardly from port 21 forming a generally disc shape mass which will hereinafter be referred to as flake-shaped mass 37.

Rotation of component 20 on shaft 24 after a flake-shaped mass 37, FIG. 3, has formed in void 45 causes the parting edge 31 of the next successive blade 30 to scrape across area 38 surrounding port 21 whereby mass 37 is peeled therefrom and parted from extrusible material 44 within extruder 22 forming discrete flake 46. As discrete flake 46 is thus formed it slides along front face 32 and passes through slot 39 whereupon the flake is separated from the apparatus to be collected with other flakes separated from the apparatus for further processing and/or packaging.

The preferred apparatus has been determined to be particularly useful in making uniformly shaped flakes of pressure-release puffable extrusible material, pressure-release puffable material being distinguished from material that is puffed upon being subjected to intense surface heating. That is, pressure-release puffable material is material that is heated while pressurized (as in an extruder) to a temperature sufficiently above the boiling point of water that the water content of the material will rapidly form steam upon release of the pressure. The steam thus generated causes the material to puff. Of course, as is well known to persons skilled in the puffing art, the amount of puffing will be dependent on the relative quantity of water in the material, and the temperature and pressure it is subjected to.

For example, substantially uniformly shaped, puffed corn flakes can be made of a relatively dry mix consisting of corn meal and starch in the ratio of about nine to one with from about 4 percent to about 6 percent added water. This mix is extruded through a 1/4 inch diameter port at a temperature of about 250° F. into voids 45 approximately 30 thousandths of an inch thick formed by first surfaces 35 on a steel component 20 having five blades spaced at 72° intervals. A suitable component 20 has an outside diameter of approximately two and three quarters of an inch and each parting edge 31 is approximately seven eighths of an inch long extending radially inwardly from the rim of component 20. With the extruder operating at about 200 pounds of mix per hour and with component 20 rotating at a relatively constant angular rate, relatively uniformly shaped, puffed flakes having a major diameter of about 17.8 mm. and a minor diameter of about 13.8 mm. are produced.

It is believed that voids 45, being unsealed by virtue of not having defined edges, function as post extrusion expansion chambers wherein extruded material having a temperature considerably above the boiling point of water expands to puff the material as the water in the mix becomes steam upon the mix being intromitted directly into the unsealed voids.

It is also believed that movement of first surfaces 35 during the formation of flake-shaped masses 37 does not significantly distort masses 37 formed of a relatively dry mix because the masses are attached, during their formation, to the extrusible material within the extruder which acts to retard dislodging masses 37 from adjacent port 21 until component 20 separates masses 37 with parting edges 31 and ejects them through slots 39.

The instant invention can be used to make flakes from more sticky extrusible material than dry mixes such as delineated in the example through the use of means of maintaining the integrity of the masses 37 as the voids 45 are de-formed and/or as the first surfaces 35 slide over the masses 37, such means being: by treating and/or coating first surfaces 35 with friction reducing agents such as teflon or oil; or providing component 20 with passages and ports to maintain an air cushion between masses 37 and first surfaces 35 and/or to dislodge masses 37 therefrom by air blasts. These and other techniques for handling sticky masses are well known to persons of ordinary skill in the art so will not be further amplified herein.

Although the preferred embodiment of the instant invention and the example have referred to the use of a five bladed component 20 having co-planar first surfaces 35, radially extending blades 30, and a frustoconical sectional shape, and although rotation of component 20 at a constant angular velocity has been referred to, they are not deemed to be critical to the instant invention. For example, component 20 could have more or less than five blades or only one blade and still function adequately. However, configurations wherein the mean arc length of a first surface 35 is much greater than the length of edge 31 would tend to be less efficient for making disc shaped flakes by requiring unnecessary sliding of its first surface 35 over masses 37.

Referring to FIGS. 4–6, an alternative embodiment of component 20 is shown in which blades 30 are formed in its rim so that the major portion 32b of the front faces of blades 30 are co-planar rather than being portions of a frustoconical surface. Also, first surfaces 35, FIG. 6, are inclined rather than being co-planar thus forming tapered voids as opposed to wafer-shape voids of uniform thickness.

Yet another alternative embodiment of component 20 is shown in FIGS. 7–9 to have fluted front face portions 32a and 32b, the flutes having peaks 49 and vaults 50, for the purpose of reducing the contact area between those portions and flakes 46 passing thereacross in order to reduce the incidence of flakes 46 sticking thereto.

Referring again to the rotation of component 20, it can be either incremental or continuous at uniform or nonuniform angular rates. However, the timed relation between rotating component 20 and the rate of intromitting extruded material into voids 45 determines the diameter of flakes 46. The relative rate ratio, that is the rate of rotating component 20 relative to the rate of extruding material determines, for a given geometry apparatus, the average diameter of flakes produced therein. Therefore, if substantially uniformly shaped flakes of substantially uniform average diameters are desired, the relative rate ratio must be constant. On the other hand, if substantially uniformly shaped flakes of various average diameters are desired, suitable means for varying the relative rate ratio can be utilized to effect such an end. Yet another manner of utilizing the instant invention to make a variety of different average diameter flakes is to provide component 20 with a plurality of blades subtending different angles, and rotating it at either a constant or varying angular velocity.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed is:

1. An improved extrusion apparatus for making puffed flakes of pressure-release puffable material issuing from a discharge port of an extruder which flakes have mean diameters substantially greater than the diameter of said discharge port, said improvement comprising:

an external planar surface area of said extruder surrounding said port;
a flake forming component comprising a radially extending blade having a parting edge, a front face, a rear face, and a planar first surface, said first surface extending circularly from said back face of said blade to adjacent but spaced from said front face forming a radially extending flake-passing slot between said first surface and said front face, said component being rotatably mounted with respect to said planar surface area so that said parting edge revolves in the plane of said planar surface area and so that said first surface is parallel to said planar surface area and spaced the thickness of a flake therefrom, said component being so disposed that when rotated said first surface and said parting edge alternately sweep past said port, and so that a radially unconfined flake forming void is defined intermediate said first surface and said planar surface area when they are oppositely disposed; and
drive means for rotating said component in timed relation with the rate of extruding material from said port whereby a flake-shaped shaped mass having a diameter substantially greater than the diameter of said port is formed and puffs in said void intermediate said planar surface area and said first surface while said first surface is disposed opposite said port, and said flake-ahaped mass is peeled from said planar surface area by said parting edge to form a discrete puffed flake which passes through said slot.

2. The apparatus for making flakes of claim 1 wherein said front face of said blade is fluted whereby the surface area of said front face that said flake contacts as said flake passes through said slot is substantially reduced so that said flake is substantially precluded from adhering to said front face.

* * * * *